(12) United States Patent
Rapp

(10) Patent No.: US 7,938,455 B2
(45) Date of Patent: May 10, 2011

(54) DEVICE FOR AXIALLY CONNECTING AN EXTERNAL PIPE SECTION TO A COAXIAL PEG OR AN INTERNAL PIPE SECTION THAT ENGAGES IN SAID SECTION

(75) Inventor: Holger Rapp, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 171 days.

(21) Appl. No.: 12/377,074

(22) PCT Filed: Jul. 6, 2007

(86) PCT No.: PCT/EP2007/056869
§ 371 (c)(1),
(2), (4) Date: Feb. 10, 2009

(87) PCT Pub. No.: WO2008/019912
PCT Pub. Date: Feb. 21, 2008

(65) Prior Publication Data
US 2010/0156092 A1    Jun. 24, 2010

(30) Foreign Application Priority Data
Aug. 18, 2006   (DE) .......................... 10 2006 038 841

(51) Int. Cl.
*F16L 37/00*    (2006.01)
(52) U.S. Cl. ........................................ 285/305; 285/403
(58) Field of Classification Search .................. 285/305, 285/276, 320, 321, 403
See application file for complete search history.

(56) References Cited

U.S. PATENT DOCUMENTS

| 1,698,087 | A | * | 1/1929 | Field ............................ 285/321 |
| 2,969,994 | A | * | 1/1961 | Jacobs et al. .................. 285/321 |
| 3,603,619 | A | * | 9/1971 | Bengesser et al. ............ 285/321 |
| 5,970,953 | A | * | 10/1999 | Lorraine et al. .............. 285/305 |
| 5,979,411 | A |   | 11/1999 | Ricco |
| 7,497,479 | B2 | * | 3/2009 | Moessinger .................. 285/305 |
| 2004/0051313 | A1 |   | 3/2004 | Trouyet |

FOREIGN PATENT DOCUMENTS

| DE | 3601898 C1 | 3/1987 |
| EP | 0886065 A1 | 12/1998 |
| WO | 0040857 A1 | 7/2000 |

* cited by examiner

*Primary Examiner* — David E Bochna
(74) *Attorney, Agent, or Firm* — Ronald E. Greigg

(57) ABSTRACT

The invention relates to a device for axially connecting an external pipe section to a coaxial peg or internal pipe section that engages in the external pipe section, in particular for connecting the drain connecting piece of an injector for injecting fuel into internal combustion engines to a fuel return connector. The external pipe section has two diametrically opposed retaining slots that penetrate the wall of the external pipe section and which correspond to grooves on the periphery of the peg or internal pipe section. Two opposing sprung retaining arms of a clamp-type retaining clip pass through the retaining slots of the external pipe section from the exterior and snap into the grooves of the peg or internal pipe section in a sprung manner. One essential feature of the invention is that the parallel retaining slots of the external pipe section are offset in height in relation to one another, while the whole of the retaining clip, when not fitted onto the pipe sections, lies on one plane.

20 Claims, 3 Drawing Sheets

DEVICE FOR AXIALLY CONNECTING AN EXTERNAL PIPE SECTION TO A COAXIAL PEG OR AN INTERNAL PIPE SECTION THAT ENGAGES IN SAID SECTION

CROSS-REFERENCE TO RELATED APPLICATION

This application is a 35 USC 371 application of PCT/EP 2007/056869 filed on Jul. 6, 2007.

BACKGROUND OF THE INVENTION

1. Field of the Invention

The invention relates to a device for axially connecting an external pipe section to a coaxial peg or internal pipe section that engages in the external pipe section, in particular for connecting the drain connecting piece of an injector for injecting fuel into internal combustion engines to a fuel return connector.

2. Description of the Prior Art

In injectors, in particular so-called common rail injectors, the fuel return is usually connected to a so-called outlet fitting. In this case, a return plug provided with an O-ring is inserted into the inner bore of the outlet fitting. The O-ring seals the connection from the outside environment. In order to prevent an unwanted detachment of the return plug, it is known to fasten the return plug above the O-ring by means of a holding clip. The holding clip is a spring wire bent into a special shape, which is guided by means of two opposing slots milled into the outlet fitting and reaches far enough into the inner bore that the return plug is fastened to a diametrical step and is prevented from moving out of the return bore.

A connection of the injector outlet fitting/return plug according to the above-mentioned prior art is the subject of EP 0 886 065 B1.

During the operation of the injectors in question, powerful vibrational loads occur in the region of the outlet fitting/return plug connection, which can cause the holding clip to execute rapid movements inside the space provided for it. The high frequency impacts of the holding clip against the boundary surfaces of the holding slots in the outlet fitting causes wear on these surfaces. In the worst-case scenario, the wear can result in the destruction of the outlet fitting and the loss of the holding function of the clip.

In order to avoid the above-mentioned disadvantages, a clasped holding clip has been developed, which is wedged into the two holding slots of the outlet fitting so that the holding clip is no longer able to execute any appreciable movement inside the outlet fitting, even in the presence of a powerful vibrational movement. However, this design also turns out to be disadvantageous in that the required clasping of the ends of the holding clip is a relatively imprecise process that is also complex and therefore entails additional costs.

The object of the invention is to assure a play-free connection of the external pipe section, e.g. the outlet fitting of an injector, and the inner pin or pipe section, e.g. the return plug of an injector, without requiring a time-consuming and/or imprecise (plastic) deformation of the holding clip.

SUMMARY OF THE INVENTION

As a result of the vertical offset according to the invention and/or the skewed orientation of the opposing holding slots in the external pipe section, e.g. an injector outlet fitting, in the assembled state of the external pipe section and the pin or internal pipe section (e.g. the outlet fitting and return plug of an injector), the holding clip—which is unclasped, i.e. planar, in the uninstalled state—is elastically deformed and therefore braced, effectively preventing play between the two connected structural parts and therefore the occurrence of material damage to these parts.

BRIEF DESCRIPTION OF THE DRAWINGS

Exemplary embodiments of the invention will be described in detail below in conjunction with the drawings, in which.

DESCRIPTION OF THE PREFERRED EMBODIMENTS

Figure 1:
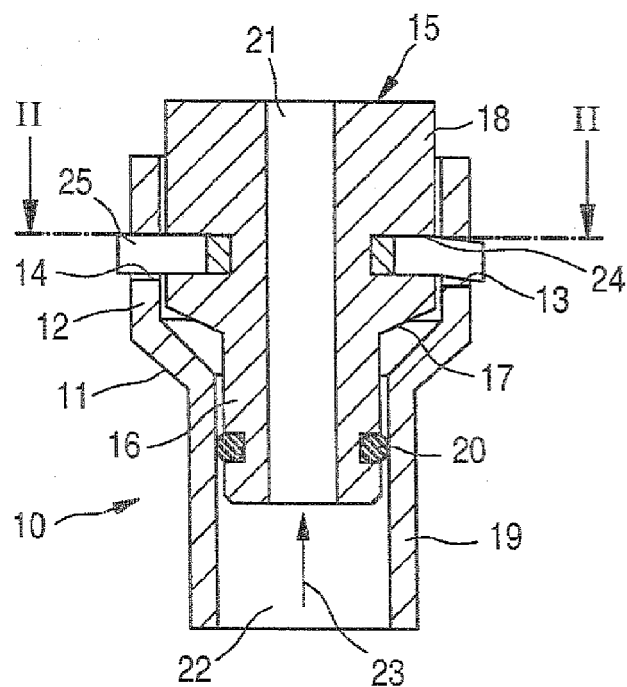
FIG. 1 shows a schematic vertical longitudinal section (section I-I in FIG. 2) through an embodiment of an outlet fitting/return plug connection of an injector for injecting fuel into combustion chambers of internal combustion engines.
Figure 2:
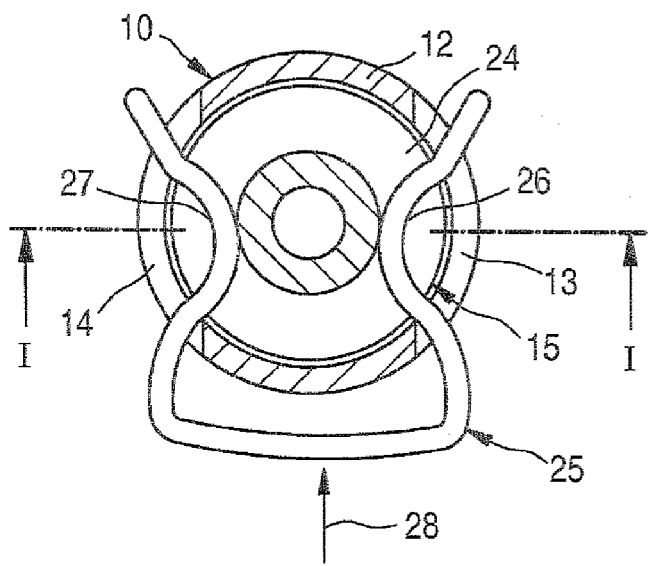
FIG. 2 shows a schematic section along the line II-II in FIG. 1, FIG. 3 schematically depicts an embodiment of a holding clip of the type used, for example, in the arrangement according to FIGS. 1 and 2, viewed in the direction of arrow 28 (FIG. 2)

In order to fasten the return plug 15 into its installed position shown in FIG. 1 and thereby, in particular, prevent any relative axial movements between the return plug 15 and the outlet fitting 10, the expanded upper region 18 of the return plug 15 has an annular groove 24 into which a holding clip 25 made of spring wire is clipped. FIG. 2 shows that the holding clip 25 is symmetrically shaped in the form of a bracket and has two holding arms 26, 27 crimped radially inward, which pass through the holding slots 13, 14 of the outlet fitting 10 and engage resiliently in the annular groove 24 of the return plug 15. The free ends of the two holding arms 26, 27 are shaped so that they splay outward.

Figure 4:
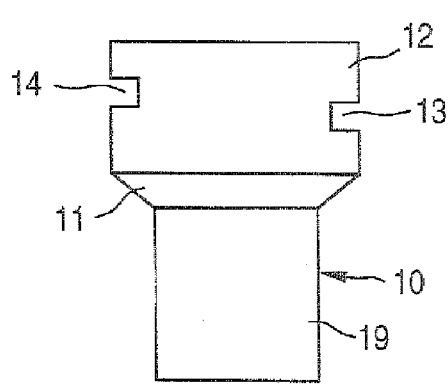
FIG. 4 is a schematic front view of an embodiment of an outlet fitting (without a return plug installed in it)
Figure 5:
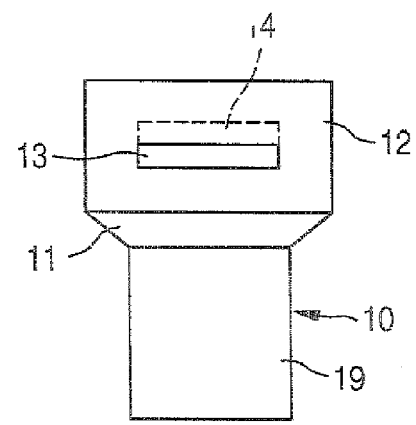
FIG. 5 is a schematic side view of the outlet fitting according to FIG. 4.

In FIGS. 1 and 2, the reference numeral 10 indicates a hollow, cylindrical outlet fitting of an injector, e.g. a common rail injector (the remaining components of which are not shown). Because of a conical expansion 11, the outlet fitting 10 has a larger diameter in its upper region 12. At two diametrically opposed locations in the outlet fitting region 12, two horizontally oriented holding slots 13, 14 are incorporated into it, which are parallel to each other, but vertically offset from each other in the axial direction of the outlet fitting 10 (also see FIGS. 4 and 5).

As is also clear from FIG. 1 in particular, a cylindrical return plug labeled as a whole with the reference numeral 15 is mounted in the outlet fitting 10. This return plug has a smaller-diameter lower region 16 and—due to a conical expansion 17—a larger-diameter upper region 18. The diameter of the lower return plug region 16 here corresponds to the inner diameter of a lower region 19 of the outlet fitting 10, while the diameter of the upper return plug region 18 corresponds to the inner diameter of the upper outlet fitting region 12. The return plug 15 is fitted into the outlet fitting 10 as described above and is also visible in FIGS. 1 and 2. At its lower end in the region 16, in an annular groove, the return plug 15 has an elastic sealing ring (a so-called O-ring) 20, with which it is sealed against the inner wall of the outlet fitting 10.

The return plug 15 also has an axial bore 21 extending all the way through it, which in the assembled state of the outlet fitting 10 and return plug 15, is coaxial and concentric to the cylindrical inner chamber 22 of the outlet fitting 10. An arrow 23 indicates the flow direction of the fuel that flows out of the outlet fitting 10 into the return plug 15.

In order to fasten the return plug 15 into its installed position shown in FIG. 1 and thereby, in particular, prevent any relative axial movements between the return plug 15 and the outlet fitting 10, the expanded upper region 18 of the return plug 15 has an annular groove 24 into which a holding clip 25 made of spring wire is clipped. FIG. 2 shows that the holding clip 25 is symmetrically shaped in the form of a bracket and has two holding arms 26, 27 crimped radially inward, which pass through the holding slots 13, 14 of the holding fitting 10 and engage resiliently in the annular groove 24 of the return plug 15. The free ends of the two holding arms 26, 27 are shaped so that they splay outward.

Figure 3:
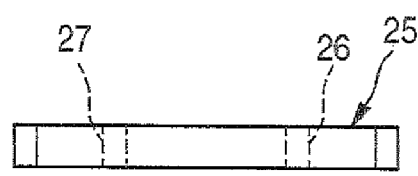

FIG. 3 shows that in the uninstalled state, when viewed from the front (arrow 28 in FIG. 2), the holding clip 25 has a planar form. In the installed state (FIGS. 1 and 2), however, the axial vertical offset of the holding slots 13, 14 in the outlet fitting 10 subjects the holding clip 25 to a clasping action with a simultaneous bracing. This has the advantageous effect that the holding clip 25 is fastened in the outlet fitting 10 without play and it is consequently possible to prevent any relative axial movements between the holding clip 25 and the outlet fitting 10. As a result, no wear is induced on the contact surfaces of the holding clip 25 and the holding slots 13, 14 on the one hand and of the holding clip 25 and annular groove 24 on the other.

In lieu of the annular groove 24 in the return plug 15, it is also conceivable to provide two parallel lateral milled indents or grooves in which the holding clip 25 could engage. It would also be conceivable for these grooves to be vertically offset from each other in the axial direction (arrow 23, FIG. 1) in order to produce a clasping and bracing of the holding clip 25.

Figure 6:
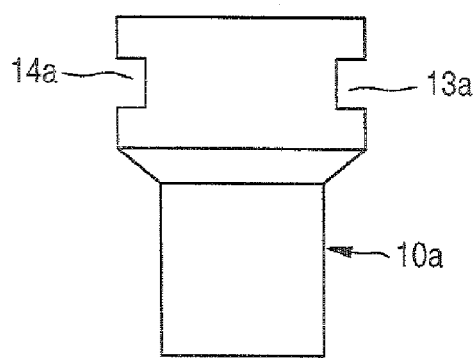
FIG. 6 is a schematic front view of another embodiment of an outlet fitting.
Figure 7:
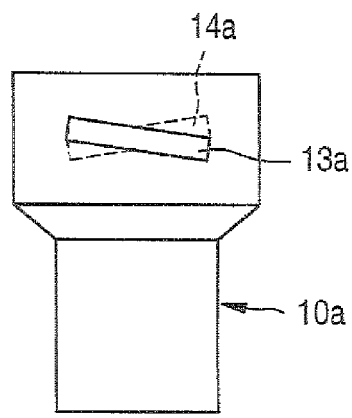
FIG. 7 is a schematic side view of the outlet fitting according to FIG. 8.

In the embodiment according to FIGS. 6 and 7, the holding slots in the outlet fitting 10a, labeled here with the reference numerals 13a and 14a, are in fact parallel in a top view (when viewed from above); in the side view (FIG. 7), however, they are oriented askew from each other. This alternative embodiment can also be used to produce a clasping and bracing of the holding clip 25—which is unclasped/planar at first (FIGS. 1 through 3)—when the return plug 15 is in the installed state (FIGS. 1 and 2).

Figure 8:
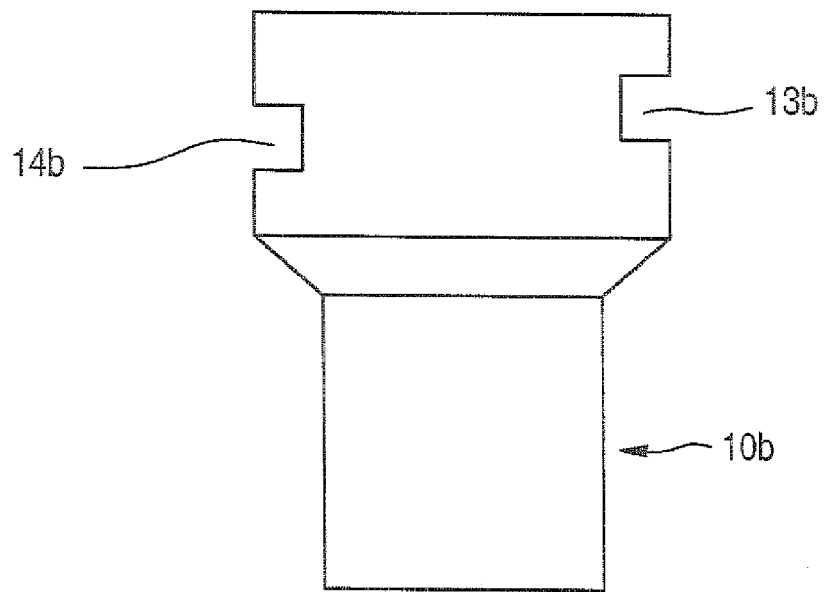
FIG. 8 is a schematic front view of another variant of an outlet fitting.
Figure 9:
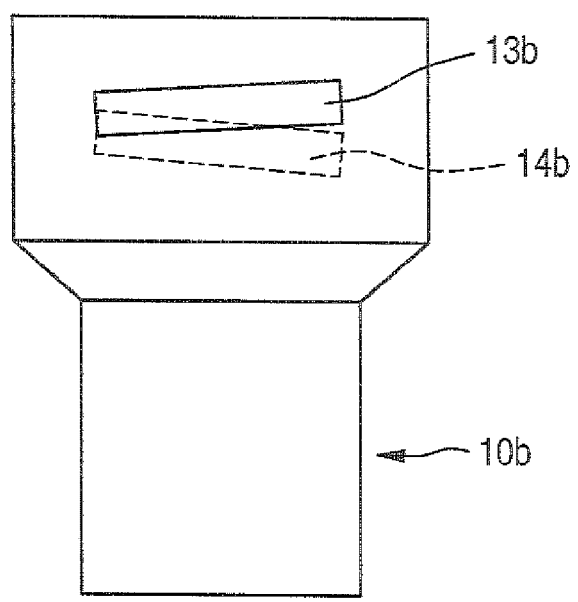
FIG. 9 is a schematic side view of the outlet fitting according to FIG. 8.

The embodiment according to FIGS. 8 and 9 features holding slots 13b and 14b in the outlet fitting 10b that are not only askew of each other, as in the embodiment shown in FIGS. 6 and 7, but are also axially offset from each other vertically, as in the embodiment shown in FIGS. 1 and 2, (see FIG. 8). This makes it possible to produce an even more powerful clasping and bracing of the holding clip 25 (FIGS. 1 through 3) in its installed position (FIGS. 1 and 2).

The foregoing relates to the preferred exemplary embodiments of the invention, it being understood that other variants and embodiments thereof are possible within the spirit and scope of the invention, the latter being defined by the appended claims.

The invention claimed is:

1. A device for axially connecting an external pipe section to a coaxial peg section or internal pipe section that engages in said external pipe section, for connecting an outlet fitting of an injector for injecting fuel into internal combustion engines to a fuel return plug, comprising:
    two diametrically opposed holding slots extending through a wall of the external pipe section which are incorporated into the external pipe section;
    two corresponding diametrically opposed, parallel grooves on a circumference of the peg section or internal pipe section; and
    two opposing resilient holding arms of a bracket-like holding clip, extending resiliently from outside through the holding slots of the external pipe section and engaging in the grooves of the peg section or internal pipe section, wherein the holding slots of the external pipe section are parallel and offset from each other in a vertical direction, whereas the holding clip as a whole constitutes a plane when in an uninstalled state.

2. The device as recited in claim 1, wherein the resilient arms of the bracket-like holding clip engage in an annular groove on the circumference of the peg section or internal pipe section.

3. The device as recited in claim 2, wherein the holding clip is embodied as a single piece and is composed of bent spring wire.

4. The device as recited in claim 2, wherein the resilient holding arms of the holding clip are first bent radially inward and then diverge again, and wherein the free ends of the resilient holding arms are shaped so that they splay outward.

5. The device as recited in claim 1, wherein said two diametrically opposed, parallel grooves are offset from each other vertically and are incorporated into an outer wall of the peg section or internal pipe section so that each groove corresponds with a respective holding slot of the external pipe section.

6. The device as recited in claim 1, wherein said two diametrically opposed grooves are offset from each other vertically and askew of each other, but parallel to each other when viewed axially from above and are incorporated into an outer wall of the peg section or internal pipe section so that each groove corresponds with a respective holding slot of the external pipe section.

7. The device as recited in claim 1, wherein the holding clip is embodied as a single piece and is composed of bent spring wire.

8. The device as recited in claim 1, wherein the resilient holding arms of the holding clip are first bent radially inward and then diverge again, and wherein the free ends of the resilient holding arms are shaped so that they splay outward.

9. A device for axially connecting an external pipe section to a coaxial peg section or internal pipe section that engages in said external pipe section, for connecting an outlet fitting of an injector for injecting fuel into internal combustion engines to a fuel return plug, comprising:
    two diametrically opposed holding slots extending through a wall of the external pipe section which are incorporated into the external pipe section;
    two corresponding diametrically opposed, parallel grooves on a circumference of the peg section or internal pipe section; and
    two opposing resilient holding arms of a bracket-like holding clip, extending resiliently from outside through the holding slots of the external pipe section and engaging in the grooves of the peg section or internal pipe section, wherein the holding slots of the pipe section are parallel to each other when viewed in an axial direction, but are askew of each other when viewed from a side, whereas the holding clip as a whole constitutes a plane when in an uninstalled state.

10. The device as recited in claim 9, wherein the resilient arms of the bracket-like holding clip engage in an annular groove on the circumference of the peg section or internal pipe section.

11. The device as recited in claim 9, wherein said two diametrically opposed, parallel grooves are offset from each other vertically and are incorporated into an outer wall of the peg section or internal pipe section so that each groove corresponds with a respective holding slot of the external pipe section.

12. The device as recited in claim 9, wherein said two diametrically opposed grooves are offset from each other vertically and askew of each other, but parallel to each other when viewed axially from above and are incorporated into an outer wall of the peg section or internal pipe section so that each groove corresponds with a respective holding slot of the external pipe section.

13. The device as recited in claim 9, wherein the holding clip is embodied as a single piece and is composed of bent spring wire.

14. The device as recited in claim 9, wherein the resilient holding arms of the holding clip are first bent radially inward and then diverge again, and wherein the free ends of the resilient holding arms are shaped so that they splay outward.

15. A device for axially connecting an external pipe section to a coaxial peg section or internal pipe section that engages in said external pipe section, for connecting an outlet fitting of an injector for injecting fuel into internal combustion engines to a fuel return plug, comprising:
two diametrically opposed holding slots extending through a wall of the external pipe section which are incorporated into the external pipe section;
two corresponding diametrically opposed, parallel grooves on a circumference of the peg section or internal pipe section; and
two opposing resilient holding arms of a bracket-like holding clip, extending resiliently from outside through the holding slots of the external pipe section and engaging in the grooves of the peg section or internal pipe section, wherein the holding slots of the external pipe section are parallel to, but offset from each other vertically when viewed in an axial direction and askew of each other when viewed from a side, whereas the holding clip as a whole constitutes a plane when in an uninstalled state.

16. The device as recited in claim 15, wherein the resilient arms of the bracket-like holding clip engage in an annular groove on the circumference of the peg section or internal pipe section.

17. The device as recited in claim 15, wherein said two diametrically opposed, parallel grooves are offset from each other vertically and are incorporated into an outer wall of the peg section or internal pipe section so that each groove corresponds with a respective holding slot of the external pipe section.

18. The device as recited in claim 15, wherein said two diametrically opposed grooves are offset from each other vertically and askew of each other, but parallel to each other when viewed axially from above and are incorporated into an outer wall of the peg section or internal pipe section so that each groove corresponds with a respective holding slot of the external pipe section.

19. The device as recited in claim 15, wherein the holding clip is embodied as a single piece and is composed of bent spring wire.

20. The device as recited in claim 15, wherein the resilient holding arms of the holding clip are first bent radially inward and then diverge again, and wherein the free ends of the resilient holding arms are shaped so that they splay outward.

* * * * *